Aug. 11, 1931.  F. H. BANBURY  1,818,449
THRUST BEARING
Filed Oct. 12, 1927  2 Sheets-Sheet 1

INVENTOR :
Fernley H. Banbury,
By Attorneys,

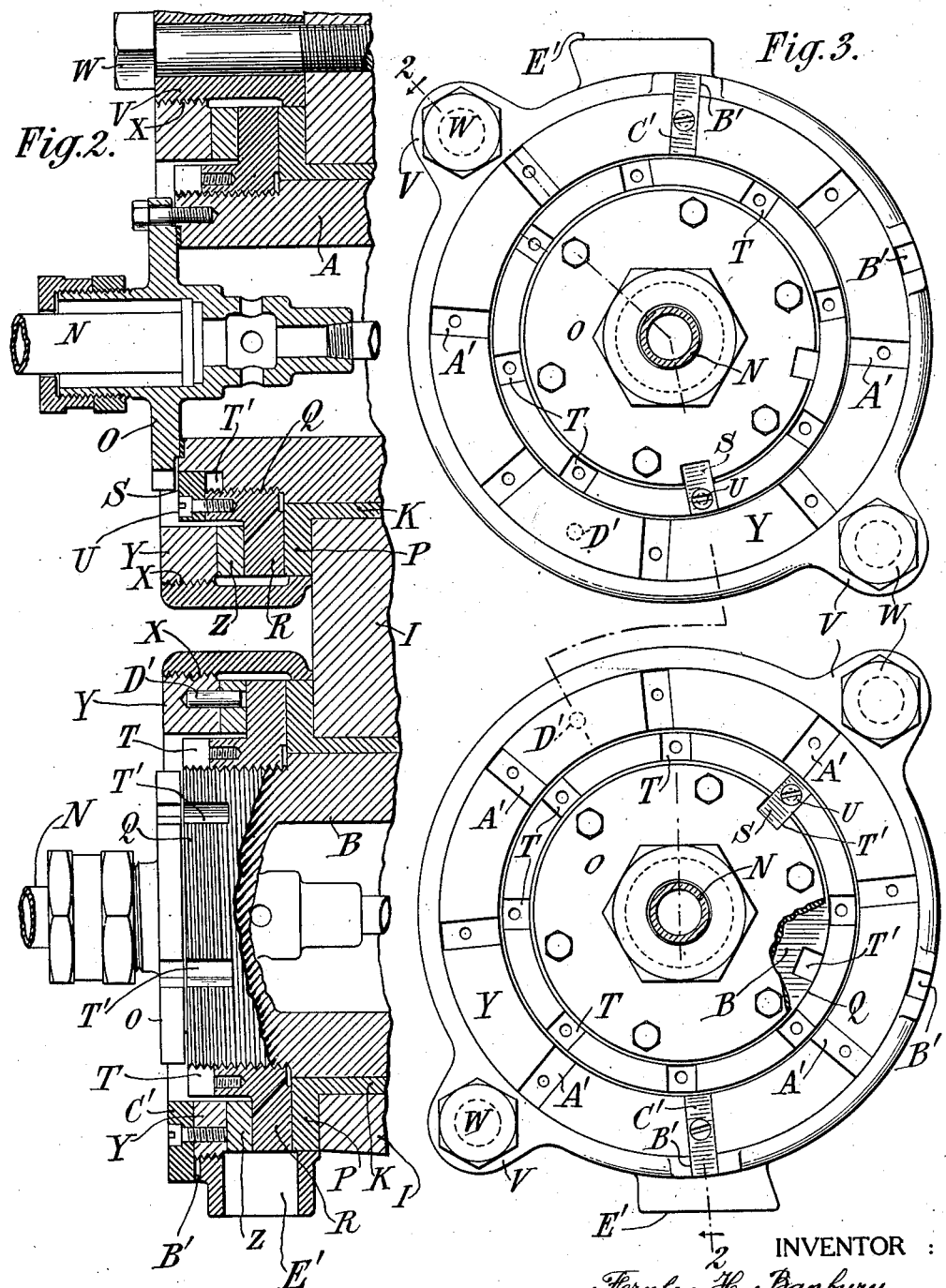

Patented Aug. 11, 1931

1,818,449

UNITED STATES PATENT OFFICE

FERNLEY H. BANBURY, OF ANSONIA, CONNECTICUT, ASSIGNOR TO FARREL-BIRMINGHAM COMPANY, INCORPORATED, OF ANSONIA, CONNECTICUT, A CORPORATION OF CONNECTICUT

THRUST BEARING

Application filed October 12, 1927. Serial No. 225,780.

This invention relates to thrust bearings and aims to provide certain improvements therein.

While the invention is susceptible of uses in other connections, it is directed particularly to thrust bearings for so-called rubber mixers wherein one or more rotors are used which are provided with blades operating to work the mixture against the interior surface of a cylindrical trough or troughs. Such mixers are illustrated, for instance, in Patent No. 1,200,070, granted to me on October 3, 1916, which patent shows and describes a pair of rotors provided with blades adapted to smear the ingredients of the mix against the walls of two connected circular troughs. Machines of this type require the use of considerable power and the end thrusts on the rotors are at times excessive. It has heretofore been the practice to mount the two thrust bearings of each rotor at opposite sides of the machine. In operation, however, because of the internal heat developed there is a considerable expansion of the rotors in a linear direction, and this occasions difficulties in adjustment of the bearings. According to the present invention I provide a thrust bearing which is easily and quickly adjusted and locked in adjusted position, and which preferably is so organized as to take up thrusts of the rotor in both directions from one side of the machine. The parts are so arranged that expansion or contraction of the rotors in the direction of their length have little or no effect upon the accuracy of adjustment, so that when a proper adjustment is secured while the machine is cold, this adjustment is equally accurate as the machine heats up in use.

The invention also includes certain other features of improvement which will be hereinafter more fully described.

In the drawings wherein I have illustrated my invention in connection with such a rubber mixing machine,—

Fig. 2 is a horizontal section of the bearings taken on the line 2—2 in Fig. 3.

Fig. 3 is a view of Fig. 2, looking from left to right, the figure being mainly in elevation.

Figure 1:
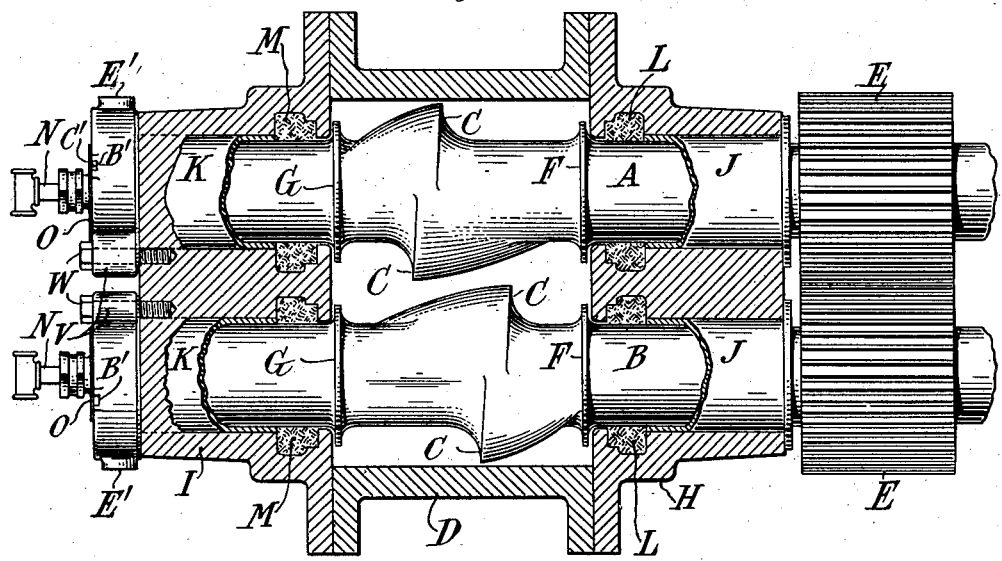
Figure 1 is a horizontal section of a rubber mixer of the type described, showing the rotors and thrust bearings in plan.

Referring first to Figure 1 of the drawings, let A B indicate two rotors of a rubber mixing machine provided with blades C of appropriate contour, which blades operate in a trough D. The two rotors A B are preferably driven by gears E E keyed to the rotors and themselves driven by any suitable prime mover. Each of the rotors is preferably provided with collars F G which are in reasonably close contact to the end walls H and I of the mixer, the latter being elongated to form extensive bearings for the rotors which are best provided with the usual bearing bushings J K. Suitable packings are also employed, such as are shown at L and M.

In the operation of such a device severe end thrusts are set up which have formerly been opposed by a pair of thrust bearings arranged one at each end of each of the rotors. Preferably the rotors are water-cooled, and for this purpose are made hollow and provided with water connections N N which are swivelled to a cap O bolted to the shaft of each of the rotors.

Referring now to Figures 2 and 3 which illustrate the preferred form of the invention, it will be understood that the bearing provided by this construction is so designed that it will take up thrusts of each of the rotors in both directions, so that all of the adjustments may be made from a single point located on one side of the machine. In the construction illustrated the thrust bearings for the two rotors are identical, and while the section in Fig. 2 includes two bearings, these may be regarded as a single structure for purposes of description.

Referring to the upper half of Figure 2, it will be observed that the bearing bushing K which surrounds the rotor shaft is provided with a flange P which bears on the right against the frame of the machine. The rotor shaft is somewhat reduced in diameter at its end and is threaded, as shown at Q, to receive a thrust collar R. The right-hand face of the thrust collar bears against the flange P and holds the rotor against thrusts from left to right. By reason of its screw-threaded connection with the rotor shaft it is capable of being adjusted to any desired point. Means are provided for locking the thrust collar in its adjusted position, which means in the preferred form comprises a key S which connects the thrust collar and shaft in their adjusted positions. Preferably the key enters slots in both the collar and shaft, so that a rigid connection is effected, and when this is adopted the fineness of adjustment accomplished depends upon the disposition of such slots. In the construction illustrated I have shown the thrust collar as provided with eight slots T cut in the outer face of the collar; with such an arrangement if the rotor shaft is provided with a single slot T, the degree of adjustment will be that which is equal to one-eighth of the distance which the thrust collar advances or retracts with one complete turn of the collar on its thread. For finer degrees of adjustment the rotor shaft may be provided with two or more slots separated from each other according to a vernier arrangement. In the drawings two such slots T' are shown which are separated a distance equal to one and one-half times the distance between the slots in the thrust collar, which arrangement permits sixteen adjustments to a complete turn of the collar. A third slot in the rotor shaft would permit thirty-two adjustments, a fourth sixty-four and so on. With a suitable fineness of thread for the connection between the thrust collar and the rotor shaft, it will be observed that any practical adjustment necessary may be made by the construction just described, and for each adjustment the parts can be rigidly locked together. The key S may be held in position by a screw bolt U or by any other suitable means.

To take up the thrusts in the opposite direction of the rotor, namely, from right to left, I preferably employ the same thrust collar R, utilizing the opposite face of the collar as a bearing surface. For this purpose I employ a headless cap V which is securely fastened to the frame of the machine in any suitable way, as by bolts W. The inner peripheral surface of this cap is threaded as shown at X, and engaging this thread is a sleeve Y, which limits the left-hand movement of the rotor shaft through the thrust collar R. For bearing purposes a thrust ring Z is best introduced between the two. The operation of adjusting the sleeve Y is similar to that already described with regard to the thrust collar R. That is to say, it is adjusted to the proper position and locked in place, preferably by an arrangement which is the same in principle as that already described. In this arrangement the sleeve Y is provided with a series of slots A' in its outer face and the cap is provided with one or more slots B' so that when the respective slots are in coincidence, a key, such as C', may be bridged across the coinciding slots. The sleeve Y is shown as provided with eight slots A' and the cap is provided with two slots B', so that in each turn the parts may be locked in sixteen different positions. As stated with regard to the adjustment of the thrust collar, the number of slots in the cap may be so increased and disposed as to provide any needful degree of adjustment. In either structure the arrangement of the slots may be reversed, and they may, of course, be increased in number, so that any desired fineness of adjustment may be attained. I have found, however, for the purpose described that a sufficient degree of adjustability is obtained by the use of the sixteen different adjustments shown in the drawings.

If the thrust ring 2 is used, it may be suitably keyed to the sleeve Y by a pin, such as shown at D' in Fig. 2.

In adjusting the particular machine shown, the parts being loosely applied, the thrust collar R is first adjusted to a position where the blades are properly centered within the trough, and then locked, whereupon the sleeve Y is adusted so that the thrust ring Z bears against the outer surface of the thrust collar, the sleeve being then also locked. Adjustments may be inspected through sight openings E' E'.

By the construction as thus described the adjustments are very easily made and can be altered to take up wear with the minimum trouble. The adjustments are practically unaffected by the expansion and contraction of the rotors in the direction of their length so that in adjusting the machine while cool, no allowance need be made for increase in the linear dimensions of the rotors due to the heating up of the machine in use.

While I have shown and described the preferred form of the invention, it will be understood that various changes may be made therein without departing from the spirit of the invention.

What I claim is:

1. In a thrust bearing for a shaft or the like, a threaded thrust collar, a part upon which it screws to adjust the bearing, said part and collar having one a plurality of means for interlocking with the other, and the other having at least two of such means, so spaced as to provide a vernier adjustment between the two.

2. In a thrust bearing for a shaft or the like, a threaded thrust collar, a part upon which it screws to adjust the bearing, said part and collar having one a plurality of interlocking slots, and the other having at least one such slot, and a key for entering a slot in each when they coincide.

3. In a thrust bearing for a shaft or the like, a threaded thrust collar, a part upon which it screws to adjust the bearing, said part and collar having one a plurality of interlocking slots, and the other having at least two such slots, spaced a different distance apart from that of the slots in the first and bridging means entering said slots to lock the part and collar.

4. In a thrust bearing for a shaft or the like, a thrust collar screwing upon the shaft, a cap having a thread, a sleeve screwing upon such thread, means for locking the collar to the shaft, and means for locking the sleeve to the cap, such means comprising slots in the shaft and collar, and in the cap and sleeve and a key for entering such slots.

5. In a thrust bearing for a shaft or the like, a thrust collar screwing upon the shaft, a cap having a thread, a sleeve screwing upon such thread, means for locking the collar to the shaft, and means for locking the sleeve to the cap, such means comprising slots in the shaft and collar, and in the cap and sleeve and a key for entering such slots, and such slots being spaced equidistantly on one of each pair of parts and being spaced on the other of each pair a distance equal to the distance between two or more slots in the first plus one half the distance between adjacent slots in the first.

6. In a thrust bearing for a shaft or the like, a thrust collar, a thrust member outwardly of said collar and adapted to prevent outward movements of the thrust collar, a stationary part to which said member screws, said part and member having means for interlocking with each other, the one having a plurality of locking means and the other having at least two such means so spaced as to provide a vernier adjustment between the two.

7. In a thrust bearing for a shaft or the like, a thrust collar, a cap secured to a stationary part and having a ring screwing thereon, said ring and cap having, one, a plurality of means for interlocking with the other, and the other having at least two such means so spaced as to provide a vernier adjustment between the two.

In witness whereof, I have hereunto signed my name.

FERNLEY H. BANBURY.